United States Patent
Andoh et al.

(10) Patent No.: US 6,850,379 B2
(45) Date of Patent: Feb. 1, 2005

(54) METHOD FOR REGISTERING A DEFECT MAP WITHIN A HARD DISK DRIVE

(75) Inventors: Haruo Andoh, Kanagawa-ken (JP);
Takashi Kuroda, Kanagawa-ken (JP);
Yuhji Yokoe, Kanagawa-ken (JP);
Toshiaki Satoh, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 501 days.

(21) Appl. No.: 10/075,928

(22) Filed: Feb. 14, 2002

(65) Prior Publication Data

US 2002/0122266 A1 Sep. 5, 2002

(30) Foreign Application Priority Data

Mar. 5, 2001 (JP) ........................................ 2001-059941

(51) Int. Cl.[7] .............................................. G11B 20/12
(52) U.S. Cl. ............................ 360/53; 360/75; 711/207
(58) Field of Search .............................. 360/53, 25, 27, 360/31, 48, 49, 69, 75, 78.04; 369/30.07, 30.08, 30.09, 30.12, 30.25, 30.3, 53.17; 711/112, 205, 207, 208, 221; 714/8, 42, 723, 770

(56) References Cited

U.S. PATENT DOCUMENTS

| | | | | |
|---|---|---|---|---|
| 5,212,677 A | * | 5/1993 | Shimote et al. ............... | 360/31 |
| 5,937,435 A | * | 8/1999 | Dobbek et al. ............. | 711/207 |
| 6,088,818 A | * | 7/2000 | Andoh et al. ................ | 714/712 |
| 6,154,858 A | * | 11/2000 | Ottesen et al. ................ | 714/42 |
| 6,212,647 B1 | * | 4/2001 | Sims et al. .................. | 711/206 |
| 6,281,676 B1 | * | 8/2001 | Ottesen et al. ................ | 714/42 |
| 6,336,202 B1 | * | 1/2002 | Tsuchimoto et al. .......... | 360/53 |

FOREIGN PATENT DOCUMENTS

| | | | |
|---|---|---|---|
| JP | 04078036 A | * | 3/1992 |
| JP | 06187800 A | * | 7/1994 |

* cited by examiner

Primary Examiner—Sinh Tran
Assistant Examiner—James L Habermehl
(74) Attorney, Agent, or Firm—Robert B. Martin; Dillon & Yudell LLP (57) ABSTRACT

A method for registering a defect map within a hard disk drive is disclosed. A hard disk drive includes a recording disk, a head assembly, and a controller. Multiple sectors are formed on the recording disk, and the head assembly includes a head for reading/writing data from/to the recording disk. The controller, which controls the head assembly to read/write data from/to the recording disk, includes a defect sector positional information holding device and a sector identification device. The defect sector positional information holding device holds positional information of a defect sector disabled to read/write data therefrom/thereto the recording disk. The positional information includes the number of the defect sectors continued in a circumferential direction and in a radial direction of the recording disk. The sector identification device refers to the positional information of the defect sector so as to identify a target sector from/in which data is to be read/written when a read/write command is received from a host computer.

5 Claims, 11 Drawing Sheets

| | | SEC-0 | SEC-1 | SEC-2 | SEC-3 | SEC-4 | SEC-5 | SEC-6 | SEC-7 | SEC-8 | SEC-9 |
|---|---|---|---|---|---|---|---|---|---|---|---|
| CYL-0 | ABA | 00 ○ | 01 ○ | 02 ○ | 03 ○ | 04 ○ | 05 ✕ | 06 ✕ | 07 ✕ | 08 ○ | 09 ○ |
| | LBA | 00 | 01 | 02 | 03 | 04 | | | | 05 | 06 |
| CYL-1 | ABA | 0A ○ | 0B ○ | 0C ✕ | 0D ✕ | 0E ✕ | 0F ○ | 10 ○ | 11 ○ | 12 ○ | 13 ○ |
| | LBA | 07 | 08 | | | | 09 | 0A | 0B | 0C | 0D |
| CYL-2 | ABA | 14 ○ | 15 ○ | 16 ✕ | 17 ✕ | 18 ✕ | 19 ○ | 1A ○ | 1B ○ | 1C ○ | 1D ○ |
| | LBA | 0E | 0F | | | | 10 | 11 | 12 | 13 | 14 |
| CYL-3 | ABA | 1E ○ | 1F ○ | 20 ✕ | 21 ✕ | 22 ✕ | 23 ○ | 24 ○ | 25 ○ | 26 ○ | 27 ○ |
| | LBA | 15 | 16 | | | | 17 | 18 | 19 | 1A | 1B |
| CYL-4 | ABA | 28 ○ | 29 ○ | 2A ✕ | 2B ✕ | 2C ✕ | 2D ○ | 2E ○ | 2F ○ | 30 ○ | 31 ○ |
| | LBA | 1C | 1D | | | | 1E | 1F | 20 | 21 | 22 |
| CYL-5 | ABA | 32 ○ | 33 ○ | 34 ✕ | 35 ✕ | 36 ✕ | 37 ○ | 38 ○ | 39 ○ | 3A ○ | 3B ○ |
| | LBA | 23 | 24 | | | | 25 | 26 | 27 | 28 | 29 |
| CYL-6 | ABA | 3C ○ | 3D ○ | 3E ○ | 3F ○ | 40 ✕ | 41 ✕ | 42 ○ | 43 ○ | 44 ○ | 45 ○ |
| | LBA | 2A | 2B | 2C | 2D | | | 2E | 2F | 30 | 31 |

| Entry (i) | PseudoLBA PLBA(i) | Track Count TCNT(i) | Sector Count SCNT(i) |
|---|---|---|---|
| Entry (1) | PLBA(1) | TCNT(1) | SCNT(1) |
| Entry (2) | PLBA(2) | TCNT(2) | SCNT(2) |
| : | : | : | : |
| Entry (n) | PLBA(n) | TCNT(n) | SCNT(n) |
| Entry (n+1) | PLBA(n+1) | TCNT(n+1) | SCNT(n+1) |
| : | : | : | : |
| Entry (m) | PLBA(m) | TCNT(m) | SCNT(m) |

(b)

| Entry (i) | PseudoLBA PLBA(i) | Track Count TCNT(i) | Sector Count SCNT(i) |
|---|---|---|---|
| Entry (1) | 0005h | 1 | 3 |
| Entry (2) | 0009h | 5 | 3 |
| Entry (3) | 002Eh | 1 | 2 |

METHOD FOR REGISTERING A DEFECT MAP WITHIN A HARD DISK DRIVE

RELATED PATENT APPLICATION

The present patent application claims priority to co-pending Japanese Application No. 2001-059941, filed on Mar. 5, 2001.

BACKGROUND OF THE INVENTION

1. Technical Field

The present invention relates to direct access storage devices in general, and in particular to hard disk drives. Still more particularly, the present invention relates to a method for registering a defect map within a hard disk drive.

2. Description of the Related Art

Hard disk drives are often used to store data processed by a computer system. A hard disk drive typically has a recording disk and a head for reading/writing data from/to the recording disk. The head accesses a target sector of the recording disk so as to read/write data therefrom/thereto. In the case where the surface of a recording disk is damaged during fabrication, some sectors in the damaged portion are often incapable of reading/writing data therefrom/thereto. That is why a read/write test must be performed on each recording disk within a hard disk drive before delivery so that any sector that does not satisfy a predefined standard is registered as an unusable sector. The positional information of all unusable sectors for each recording disk within a hard disk drive are then generated, which is commonly referred to as a defect map. The defect map is stored in a specific area of the recording disk.

During the startup process of a hard disk drive, the above-mentioned defect map is read from the recording disk and transferred to a system memory. Before data is to be read/written from/to the recording disk according to a command from a host computer, the defect map stored in the system memory is referenced in order to avoid the unusable sectors being accessed.

Some of the conventional defect maps include the "position" information registered with respect to each of the unusable sectors. In other words, unusable sectors are registered one by one in a defect map (hereinafter, this method will be referred to as the point registration method). However, the problem with such method is that each defect map grows as the number of unusable sectors increases. In order to avoid such a problem, some defect maps are designed to register the "position" of each unusable sector and the "number" of consecutive unusable sectors. Specifically, multiple consecutive unusable sectors is recognized linearly and both position and length information items are registered (hereinafter, this method will be referred to as the line registration method).

Figure 11:
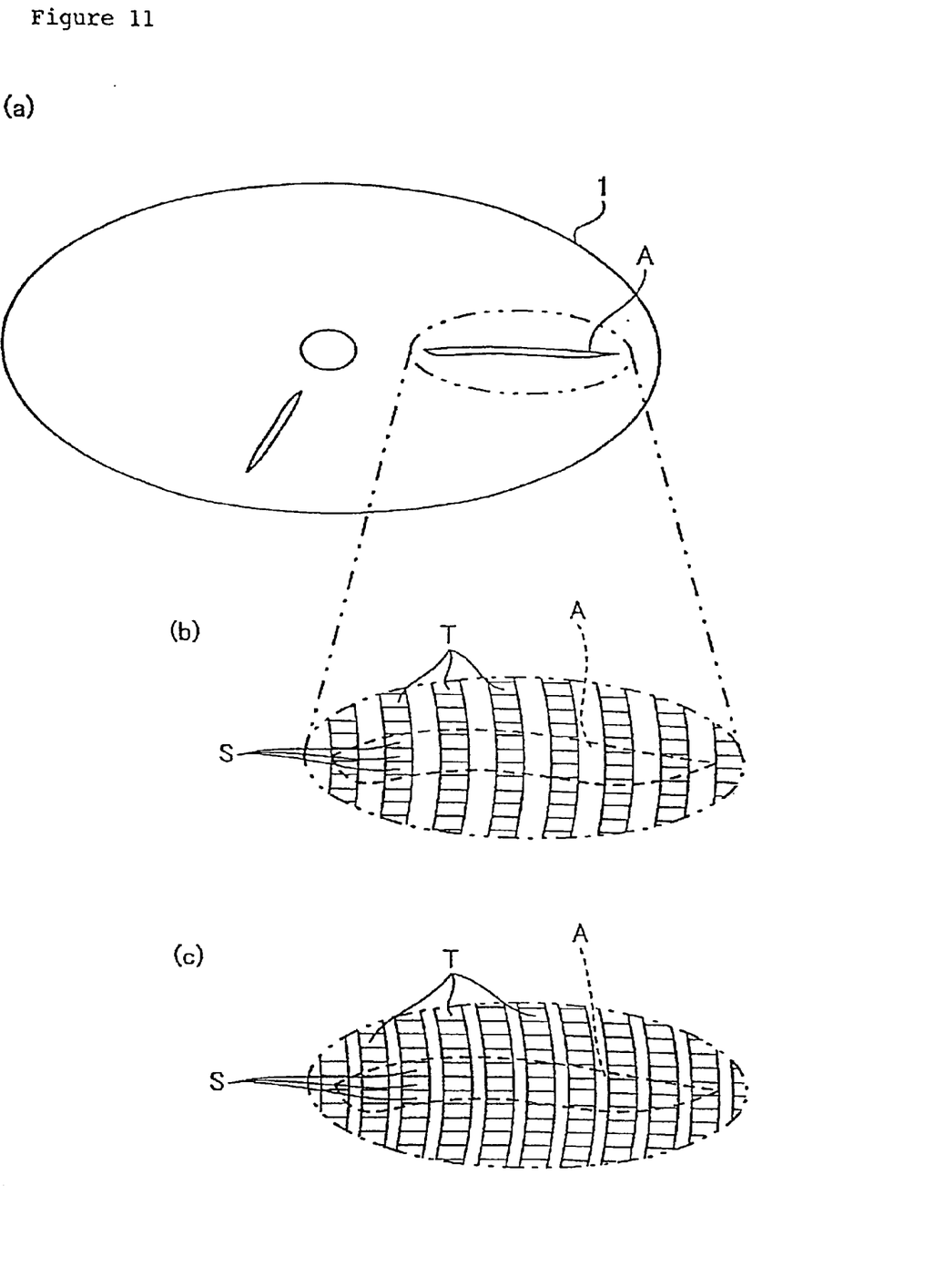
FIGS. 11(a)–11(c) show damaged sectors on a recording disk.

For example, a recording disk 1, as shown in FIG. 11(a), is damaged by a scratch A, and scratch A is extended over several sectors S in a track T, as shown in the expanded view of FIG. 11(b). Thus, those sectors often become unusable. In such a case, the above-described line registration method can assume the information about multiple unusable sectors S continued in a track T as one information item. As a result, the amount of information in a defect map can be reduced over the point registration method.

Sometimes, however, the line registration method is not the most cost effective method for recording scratch A that is extended over several tracks T, as shown in FIG. 11(b). This is because the recording density of disks has improved tremendously in recent years, and the distance between tracks T becomes shorter. Accordingly, unusable sectors S come to be generated in more tracks T, as shown in FIG. 11(c), even when the size of scratch A remains the same. As a result, the amount of data recorded in a defect map also increases proportionally with the increase in recording density of disks. When the size of a defect map increases, buffer areas for storing defect maps decrease proportionally. Accordingly, the amount of data that can be stored in the buffer areas are reduced, thereby degrading the performance of the hard disk drive. Consequently, it would be desirable to provide an improved method for registering a defect map within a hard disk drive.

SUMMARY OF THE INVENTION

In accordance with a preferred embodiment of the present invention, a hard disk drive includes a recording disk, a head assembly, and a controller. Multiple sectors are formed on the recording disk, and the head assembly includes a head for reading/writing data from/to the recording disk. The controller, which controls the head assembly to read/write data from/to the recording disk, includes a defect sector positional information holding device and a sector identification device. The defect sector positional information holding device holds positional information of a defect sector disabled to read/write data therefrom/thereto the recording disk. The positional information includes the number of the defect sectors continued in a circumferential direction and in a radial direction of the recording disk. The sector identification device refers to the positional information of the defect sector so as to identify a target sector from/in which data is to be read/written when a read/write command is received from a host computer.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
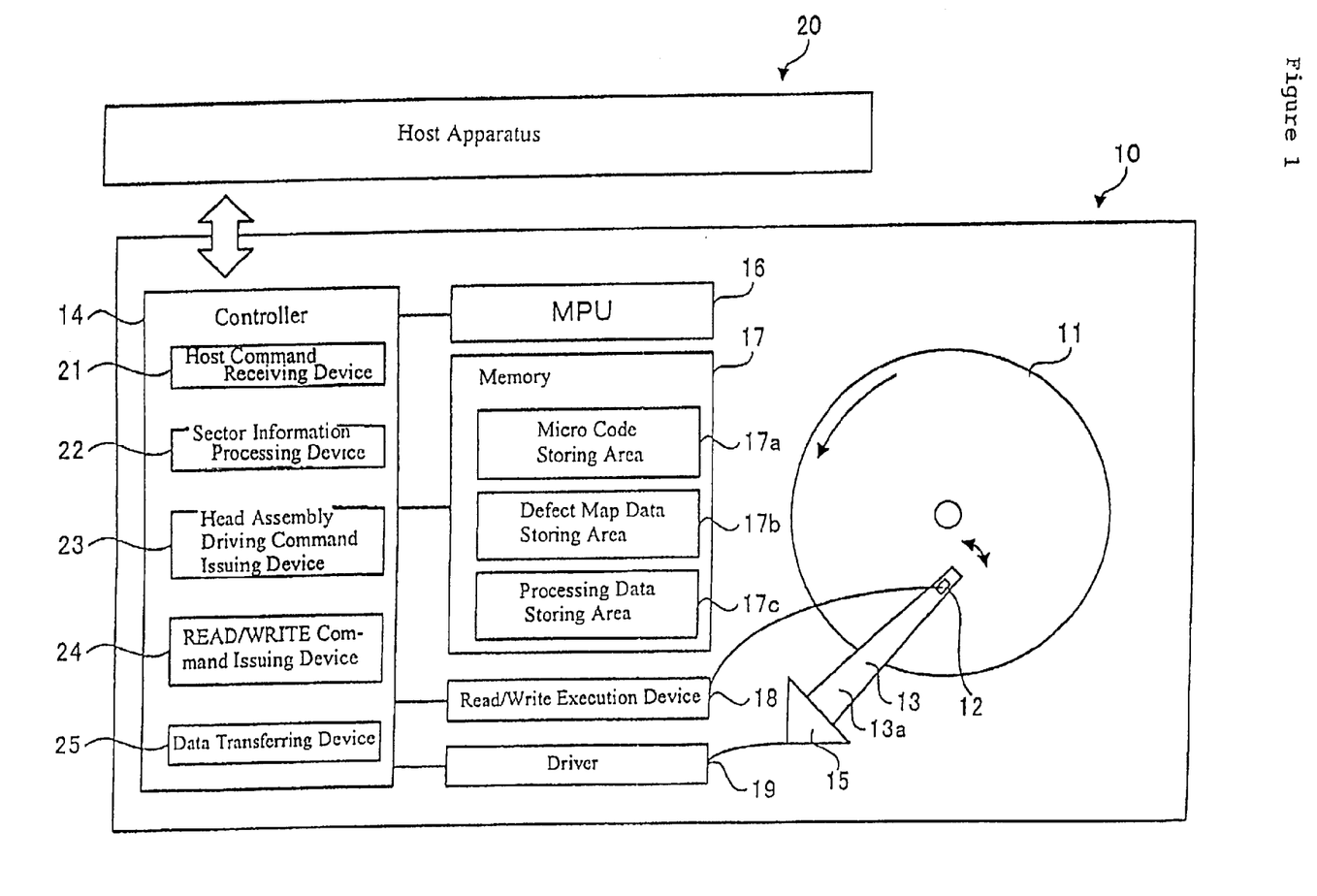
FIG. 1 is a block diagram of a computer system in accordance with a preferred embodiment of the present invention.

Referring now to the drawings and in particular to FIG. 1, there is depicted a block diagram of a computer system in accordance with a preferred embodiment of the present invention. As shown, a computer system includes a hard disk drive 10 and a host apparatus 20 that instructs reading/writing of data from/in hard disk drive 10. Hard disk drive 10 may be built in host apparatus 20 or provided outside host apparatus 20. Hard disk drive 10 is provided in a housing (not shown) with a number of recording disks 11, a head assembly 13 provided with magnetic heads 12, and a controller 14 for controlling the operations of those components. Each recording disk 11 is a non-volatile recording medium such as a magnetic disk or the like. Each recording disk 11 is driven rotationally at a predefined rotation speed by a spindle motor (not shown). Multiple tracks are concentrically formed on recording disk 11 as a block for storing data, and multiple sectors are circumferentially formed on each track.

Each recording disk 11 is provided with two areas: one area used to store data according to a command from host apparatus 20 and the other area used to store data to be processed so as to start up hard disk drive 10. The data for starting up hard disk drive 10 is a micro code, which is a program used to control hard disk drive 10 and data of a defect map (sector range information, defect sector positional information, and information of a range in which defect sectors exist) generated as positional information of unusable sectors (hereinafter, such unusable sectors will be referred to as defect sectors: specific sectors, unusable sectors) stored before hard disk drive 10 is delivered.

Head assembly 13 is formed oscillatably along the surface of each recording disk 11 around an axis assumed at the outer periphery side of recording disk 11. Head assembly 13 is driven by a voice coil motor 15. At the tip of head assembly 13 is provided a head 12, which moves almost in the radial direction of recording disk 11 so as to access (seek) a target track when head assembly 13 oscillates.

Figure 2:
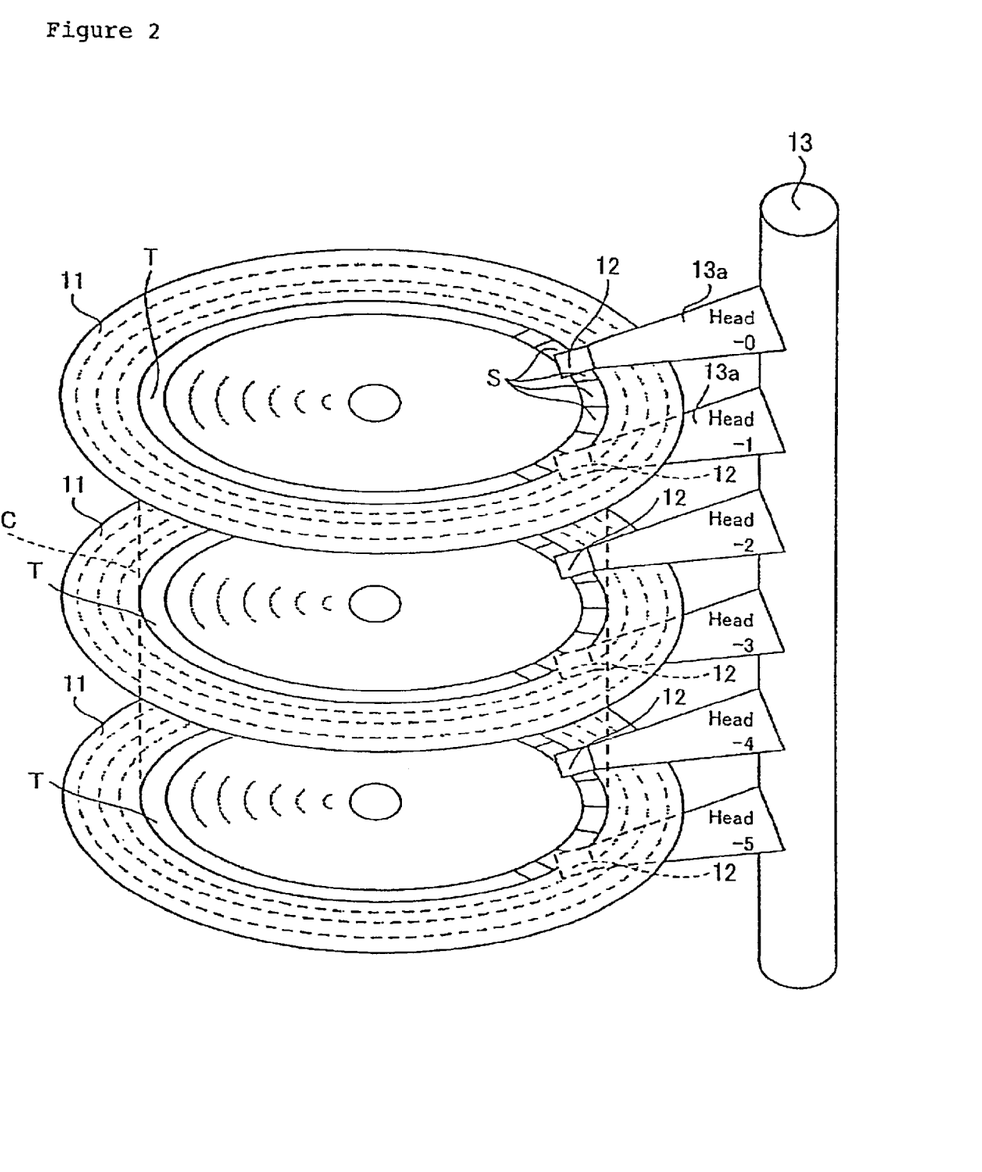
FIG. 2 depicts various recording disks of a hard disk drive within the computer system from FIG. 1.

As shown in FIG. 2, head assembly 13 is provided with multiple arms 13a. A pair of arms 13a are extended to both surfaces of each recording disk 11. Each arm 13a is provided with a head 12. That is, a pair of heads 12 are disposed for one recording disk 11 so that data is read/written from/on both surfaces of recording disk 11.

Referring back to FIG. 1, controller 14 is provided with a micro processing unit (MPU) 16, a memory 17, a read/write execution device 18 that enables each head 12 to read/write data, and a driver 19 of voice coil motor 15. Memory 17 is provided with a micro code storing area 17a for storing a micro code to be read from a predetermined area of recording disk 11 when hard disk drive 10 is started up; a defect map data storing area (defect sector positional information holding device) 17b for storing defect map data read from recording disk 11 when hard disk drive 10 is started up; and a processing data storing area 17c for storing data temporarily when the data is transferred between host apparatus 20 and recording disk 11.

Controller 14 is provided with the following functional devices: a host command receiving device 21, a sector information processing device (sector identification device) 22, a head assembly driving command issuing device 23, a read/write command issuing device 24, and a data transferring device 25.

Host command receiving device 21 receives a read/write command from host apparatus 20 and communicates the command to MPU 16. MPU 16 instructs controller 14 according to a micro code stored in the micro code storing area 17a of memory 17 to execute a processing in accordance with the command received from host apparatus 20. Host apparatus 20, when instructing hard disk drive 10 to read/write data, uses a logical address that gives no consideration to any defect sector existing on recording disk 11 so as to specify a target sector from/in which data is to be read/written, which will be described later.

Sector information processing device 22 obtains the physical address of a target sector on recording disk 11 by considering the defect sectors according to the positional information of the target sector set in the command from host apparatus 20 and the defect map data stored in the defect map data storing area 17b in memory 17.

Head assembly driving command issuing device 23 outputs a command to driver 19 so as to drive head assembly 13 so that head 12 faces a track in which the target sector exists on recording disk 11 according to the physical address of the target sector obtained in sector information processing device 22. Receiving this command, driver 19 drives head assembly 13 so that head 12 faces the track in which the target sector exists.

Read/write command issuing device 24 instructs read/write execution device 18 to enable head 12 facing the track in which the target sector exists to read/write data therefrom/therein. Upon receiving a command, read/write execution device 18 enables head 12 to read/write data from/in a predetermined sector on recording disk 11.

Data transferring device 25, when instructed to read data from host apparatus 20, receives the data read by head 12 from the target sector on recording disk 11 according to the command from read/write command issuing device 24 from read/write execution device 18, then stores the data in processing data storing area 17c of memory 17 once. Data transferring device 25 reads the data from the processing data storing area 17c and transfers the data to host apparatus 20 via a data bus (not shown). When instructed to write data from host apparatus 20, data transfer device 25 stores the data transferred from host apparatus 20 once in the processing data storing area 17c of memory 17, then reads the data from area 17c to pass the data to read/write execution device 18.

There are three items set for parameter information CHS (cylinder number, head number, sector number) used to identify a sector position when head 12 is positioned in a target sector on recording disk 11 by driving head assembly 13. Those CHS items are set in head assembly driving command issuing device 23 and in read/write command issuing device 24 of controller 14, respectively. As shown in FIG. 2, a cylinder number denotes one and the same track T as a cylinder C position on all recording disks 11 of hard disk drive 10. For example, cylinder numbers beginning at 0 are given sequentially from the outer periphery or inner periphery side of each recording disk 11. A head number denotes head 12 used to read/write data from/in a target sector. Head numbers beginning at 0 are given sequentially to the predetermined number of heads 12 provided for head assembly 13. This head number is used to identify head 12, thereby the surface of recording disk 11 on which a target sector exists is identified. A sector number denotes a target sector position in a track T. Sector numbers beginning at 0 are given sequentially to the sectors S in one and the same track T.

Data is read/written from/in a sector on each recording disk 11 in hard disk drive 10 according to the parameter information CHS consisting of a cylinder number, a head number, and a sector number, respectively. This parameter information CHS is not used between host apparatus 20 and hard disk drive 10, however. Instead, positional information is used between those apparatuses 20 and 10. The positional information is represented by a hexadecimal serial number consisting of, for example, the predetermined number of digits and given to each sector S on recording disk 11 forming hard disk drive 10. Host apparatus 20 holds host side logical block addresses (Host-Logical Block Address; hereinafter, to be referred to as HLBA: logical address, a first positional information), which is positional information that gives no consideration to any defect sectors existing on recording disk 11.

On the other hand, hard disk drive 10 uses two types of positional information for sectors S on each recording disk 11: absolute block addresses (hereinafter, to be referred to as ABA: physical addresses, a second positional information) denoting all sectors S (including defect sectors) on recording disk 11, and logical block addresses (hereinafter, to be referred to as LBA) denoting only the usable sectors S excluding defect sectors on recording disk 11. Those ABA and LBA are converted to parameter information (physical addresses, the second positional information) CHS in controller 14.

Figure 3:
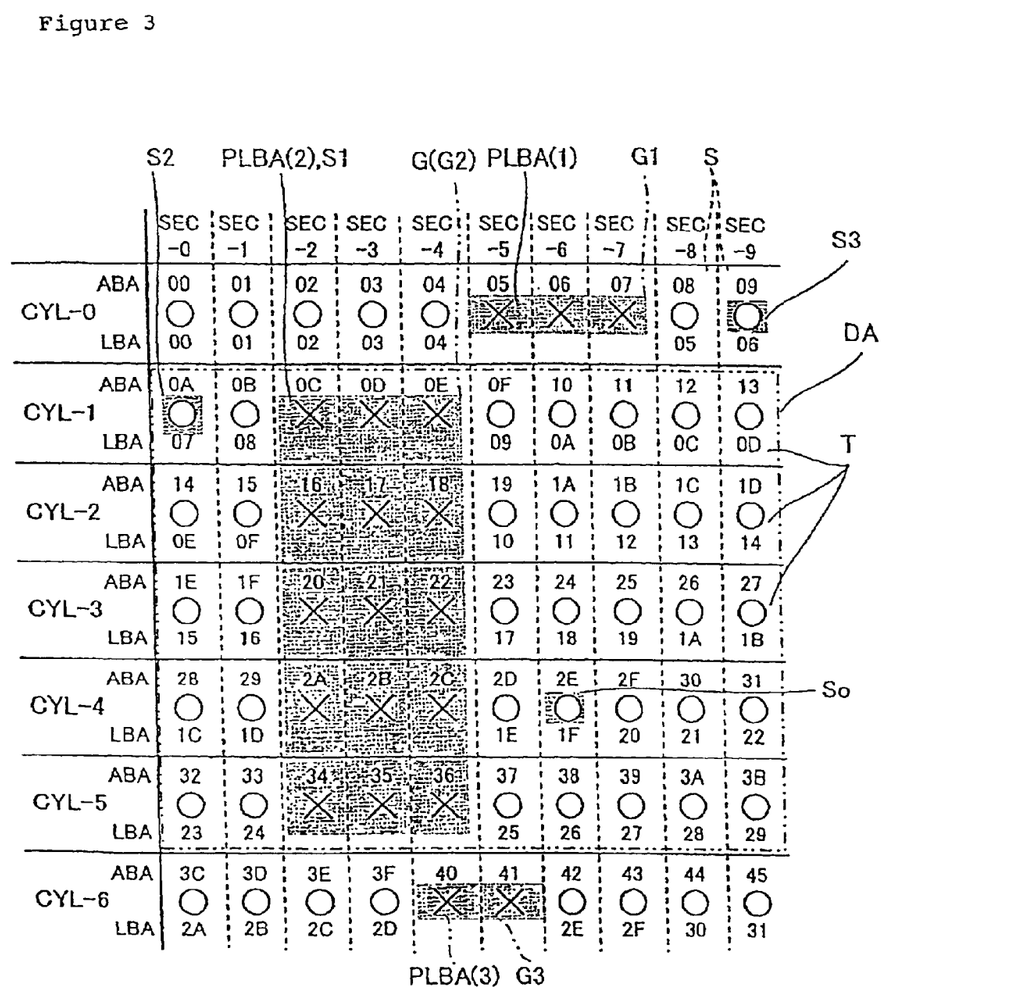
FIG. 3 shows an example of defect sectors on a recording disk.

FIG. 3 shows an example of each sector S on recording disk 11 is denoted by both ABA and LBA. In FIG. 3, only the sectors S in tracks T on a specific surface of a recording disk 11 is used for simplifying the description. In FIG. 3, the number of tracks T is 7 (CYL-0 to 6) and the number of sectors in each track T is 10 (SEC-0 to 9). The "x" marked sectors denote defect sectors, and the "o" marked sectors denote good sectors. ABA and LBA are given to each sector S.

A read/write test is done for each recording disk 11 of hard disk drive 10 in order to generate a defect map. Each sector S decided as an unusable one in the test is registered as a defect sector and the positions of all the defect sectors on each recording disk 11 are denoted in the defect map. The defect map is registered as a so-called surface with use of parameter information in the two-dimensional direction along a surface of each recording disk 11; it is not registered by the conventional point registration/surface registration method. Specifically, this embodiment uses the defect sector positional information about a group of defect sectors (hereinafter, to be referred to as a defect sector group) continued at least in the circumferential or in the radial direction of recording disk 11; a reference defect sector position, the number of tracks T in which defect sectors are disposed continuously in the radial direction of recording disk 11 from the reference defect sector position (hereinafter, to be a track count or TCNT), and the number of defect sectors continued in the direction in which tracks T are disposed continuously (hereinafter, to be referred to as a sector count or SCNT).

Figure 4:
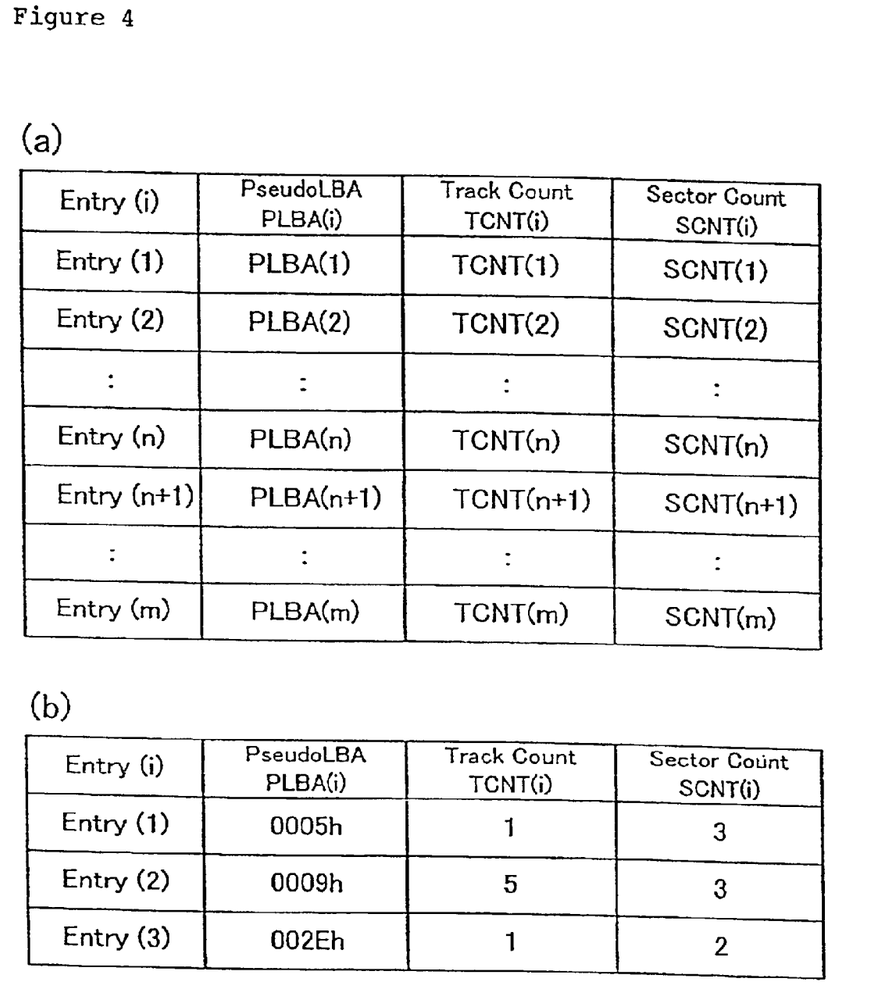
FIGS. 4(a) and 4(b) depict examples of a defect map table.

FIG. 4(a) shows an example of a defect map table generated for defect sectors existing in an entire recording disk 11 from the above-mentioned items. In this data table, Entry (i): ("i" denotes a pointer variable that assumes "m" as the maximum value) is a serial number given to a defect sector group on a recording disk 11 in order of the ABA values. Pseudo LBA (PLBA) denotes a temporary LBA (because no LBA is given actually to any defect sector) denoting the position of a defect sector (a defect sector having the lowest ABA value in a defect sector group), which becomes a reference to a defect sector group. This Pseudo LBA is obtained by subtracting the total number of defect sectors (hereinafter, to be referred to as a push count) between Entry (1) and Entry (i-1) from the ABA of a reference defect sector. Entry (1) to Entry (i-1) are defect sectors preceding the reference defect sector. The track count: TCNT(i) and the sector count: SCNT(i) of each defect sector group are stored in the defect map.

FIG. 4(b) shows an example of a defect map data table generated according to the example shown in FIG. 3. As shown, a defect sector group G in FIG. 3 is positioned at the second in the order of ABA values, so it is "Entry(2)" and the track count: TCNT(i) denoting the number of defect sectors disposed in the radial direction (in the direction in which tracks T are disposed) is "5" and the sector count: SCNT(i) denoting the number of defect sectors in the direction in which tracks T are continued becomes "3." The Pseudo LBA of the defect sector S1 at which the defect sector group G is started is obtained by subtracting the push count (track count: CTCT(1)×sector count: SCNT(3)=1×3= 3) of the "Entry(1)" preceding the "Entry(2)" from the ABA"000c" of this defect sector S1. In this table, "h" added to the end of a digit string representing the Pseudo LBA means that the digit string is a hexadecimal number.

Figure 5:
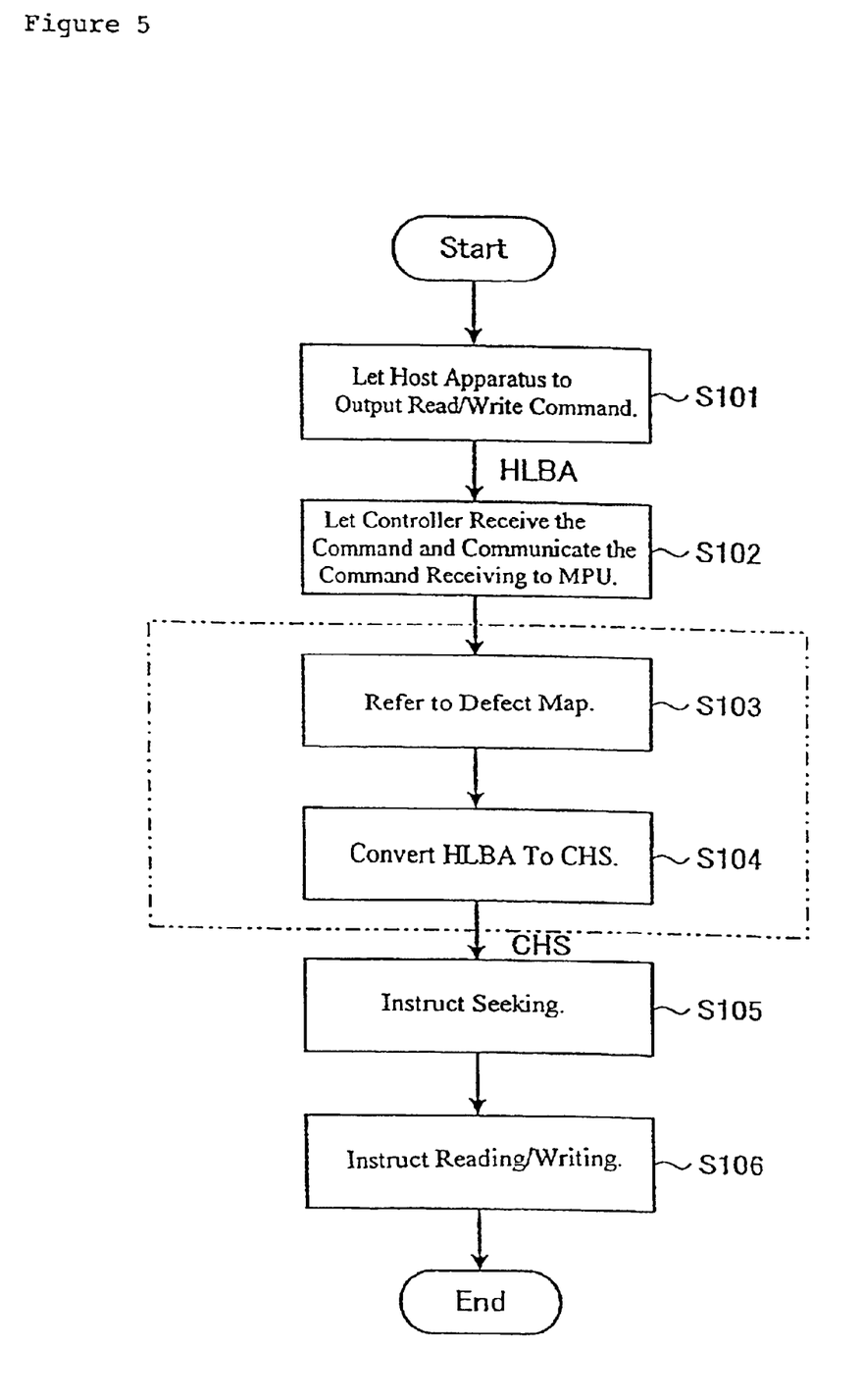
FIG. 5 shows a high-level logic flow diagram of a method for reading/writing data.

FIG. 5 shows a high-level logic flow of a method for reading/writing data in hard disk drive 10 according to a command from host apparatus 20 with use of such a defect map. In hard disk drive 10, a micro code and defect map data are read from predetermined areas on recording disk 11 when host apparatus 10 is started up, then stored in micro code storing area 17a and defect map data storing area 17b in memory 17, respectively. When host apparatus 20 outputs a read/write command (step S101), host command receiving device 21 of controller 14 of hard disk drive 10 receives the command and communications the command receiving to MPU 16 (step S102: specification receiving step). At this time, host apparatus 20 specifies a target sector from/in which data is to be read/written with an HLBA that gives no consideration to the defect map.

Upon receiving the notice, MPU 16 refers to the defect map stored in defect map data storing area 17b of memory 17 (step S103). Then, the sector information processing device 22 converts the HLBA to parameter information CHS: (cylinder number, head number, sector number) used to identify the target sector position according to the data in the referred defect map. At this time, a defect sector registered in the defect map is added to the HLBA, thereby obtaining the parameter information CHS of the target sector (step S104: positional information obtaining step).

Successively, head assembly driving command issuing device 23 obtains the cylinder number and the head number out of the parameter information CHS: (cylinder number, head number, sector number) of the objected sector which is thus obtained and instructs the seek of head assembly 13 to driver 19 (step S105). Driver 19, which has received this seek drives head assembly 13, and makes magnetic head 12 corresponding to the obtained head number seek to the track T corresponding to the obtained cylinder number. After this, head assembly driving command issuing device 24 obtains the sector number from the parameter information CHS: (cylinder number, head number, sector number) of the target sector and instructs read/write data to read/write execution device 18 (step S106). Instructed such way, read/write execution device 18 reads/writes data from/in the sector S corresponding to the obtained sector number in the sought track T (read/write execution step).

Figure 6:
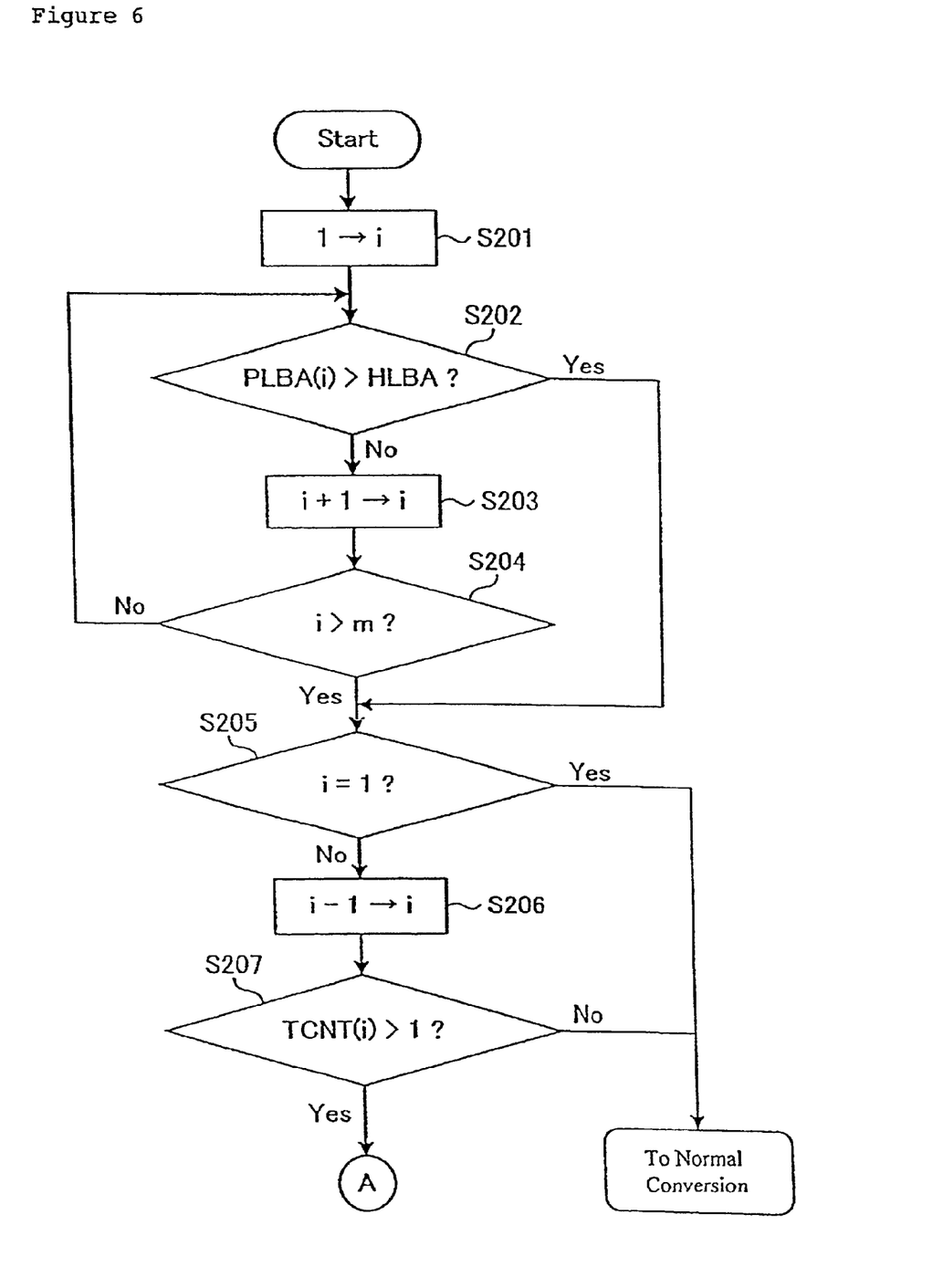
FIGS. 6–8 depict a high-level logic flow diagram of a method for identifying a target sector from/in which data is to be read/written with reference to a defect map.
Figure 7:
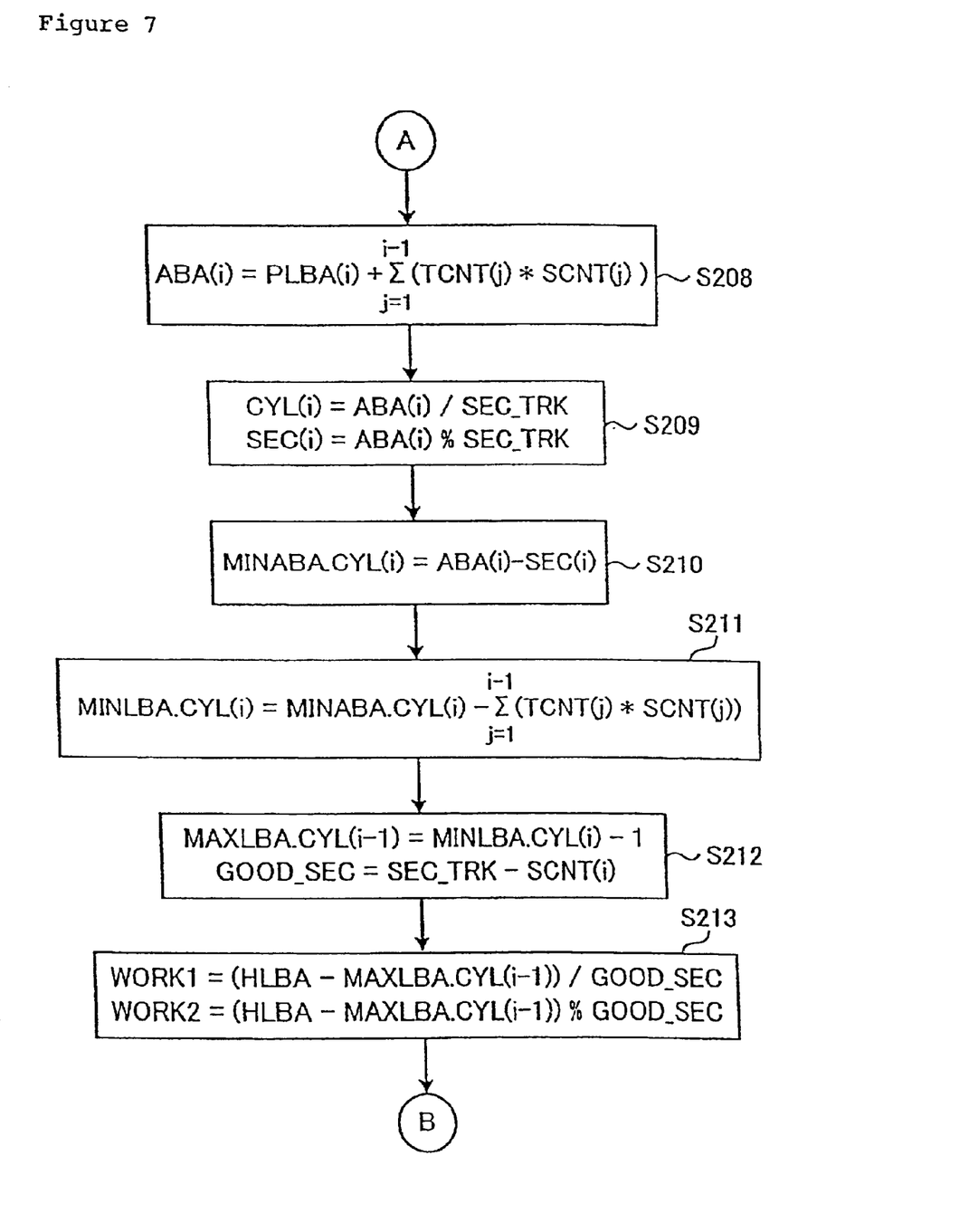
Figure 8:
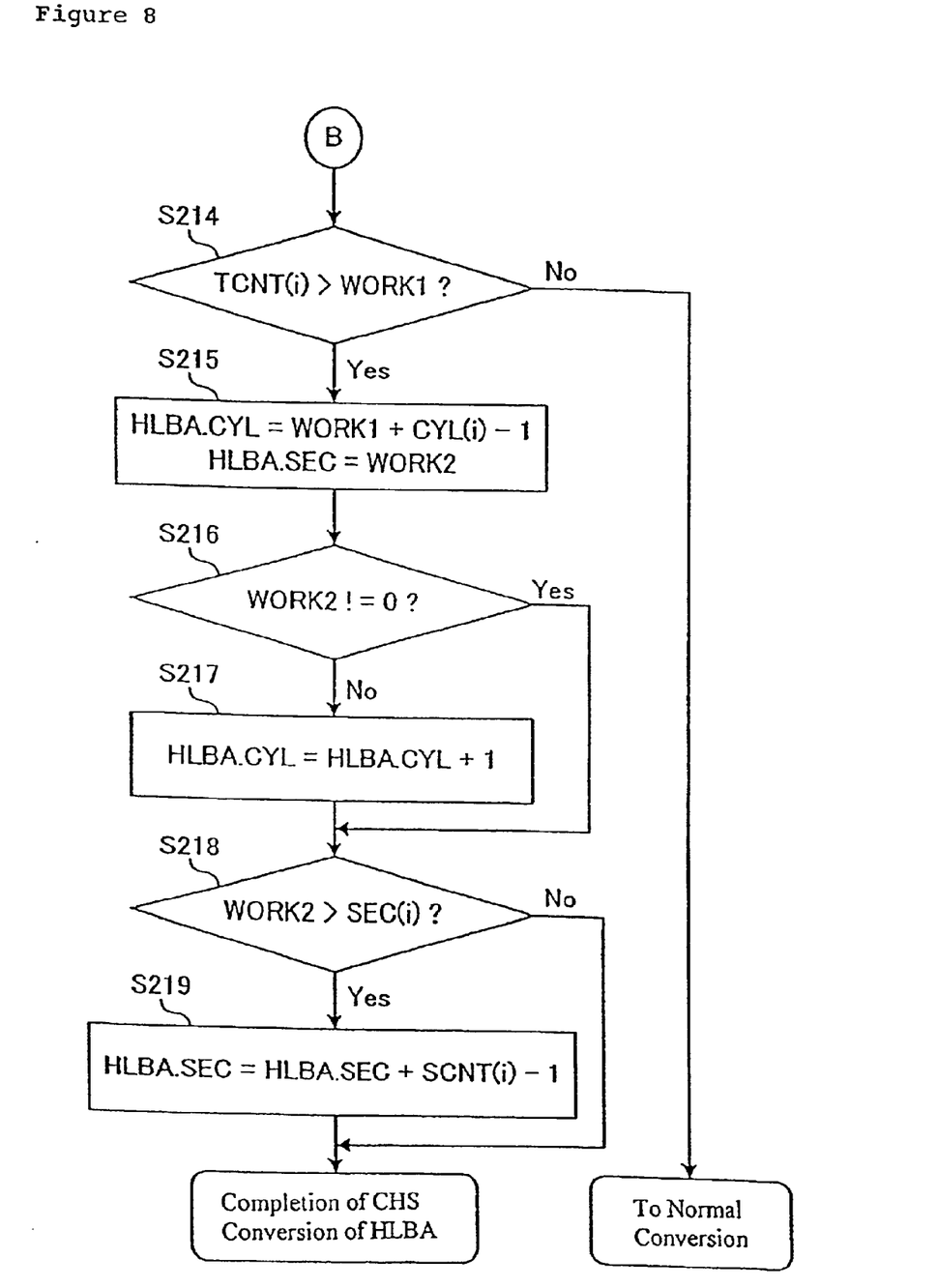

FIGS. 6 through 8 show the details of the steps executed by sector information processing device 22 in the steps S103 to S104. At first, in step S201 shown in FIG. 6, the defect map table (FIG. 4(a)) is referred so as to initialize the pointer variable "i" to "1." Then, it is decided whether or not the HLBA included in the command from host apparatus 20 is smaller than the PLBA(i) value (in this case, because the pointer variable "i" is "1," it is the Pseudo LBA value of "Entry(1)" in the defect map)(step S202). The HLBA is positional information of a target sector. When the HLBA is not smaller than the PLBA(1), the pointer variable "i" is increased in step S203, then it is decided in step S204 whether or not the pointer variable "i" reaches the maximum value m. This decision is done to check if it is the last Entry in the defect map table shown in FIG. 4(a). When the pointer variable "i" does not reach the maximum value m yet, control goes back to step S202 so as to continue the processing.

On the other hand, when it is decided in step S202 that the HLBA is smaller than the PLBA(i) and in step S204 that the pointer variable (i) reaches the maximum value m, then it is decided whether or not the pointer variable "i" is "1" at that time (step S205). When the pointer variable "i" is "1," it means that the HLBA is positioned before "Entry(1)" in the defect map. Thus, there is no defect sector before this HLBA and the push count is "0." As a result, the condition of

HLBA=ABA is satisfied.

Consequently, (cylinder number, head number, sector number) corresponding to the ABA is obtained as the parameter information CHS of the target sector. When the pointer variable "i" is not "0" in step S205, the pointer variable "i" is decreased by one (step S206). Consequently, Entry(i): (i=i−1) positioned just before the HLBA is to be examined.

Then, it is decided whether or not the track count: TCNT(i) value is greater than "1" in Entry(i) positioned just before the HLBA in the defect map (step S207). This decision is done so as to examine whether or not the defect sector group of this Entry is over multiple tracks T. When the decision result is NO, that is, when the track count: TCNT (i)=1 is satisfied, the push count (sum of track count: TCNT(i) and sector count: SCNT(i) products) in Entry(1) to Entry(i−1) are added up so as to obtain (cylinder number, head number, sector number) corresponding to this ABA as the parameter information CHS of the target sector. The following condition is assumed:

ABA=HLBA+push count

On the other hand, when the decision result in step S207 is YES, that is, when the track count: TCNT(i) value is greater than "1" in Entry(i) positioned just before the HLBA, the defect sector group of this Entry(i) is over a plurality of tracks T. In this case, control goes to step S208 shown in FIG. 7.

In step S208, the ABA(i) of the first defect sector in the defect sector group of this Entry(i) is obtained. In order to obtain the ABA(i), it is just required to add up the PLBA(i) in this Entry(i) and the push count (sum of track count: TCNT(i) and sector count: SCNT(i) products) in Entry(1) to Entry(i−1) positioned before this Entry(i).

Then, the ABA(i) of the first defect sector, obtained in step S208, is divided by the number of sectors per track: SEC_TRK so as to obtain the quotient and the remainder. The obtained quotient is the cylinder number: CYL(i) denoting the track T in which the first defect sector is positioned and the remainder becomes the sector number: SEC(i) in which the first defect sector is positioned (step S209).

Next, the ABA minimum value of this cylinder number: CYL(i): MINABA. CYL(i) in the track T, that is, the ABA of the first sector S in this track T is obtained. In order to obtain this ABA, it is just required to subtract this defect sector number: SEC(i) from the ABA(i) of the first defect sector in the defect sector group, obtained in step S208 (step S210).

Furthermore, the minimum LBA value of this cylinder number: CYL(i): MINLBA. CYL(i) in the track T, that is, the LBA of the first sector S in this track T is obtained. In order to obtain the LBA, it is just required to subtract the push count in Entry(1) to Entry(i−1) positioned before this sector S, that is, Entry(i) being examined from the ABA of this first sector, obtained in step S210 (step S211).

Then, "1" is subtracted from the LBA of the first sector S in the track in which the first defect sector is positioned, obtained in step S211. Consequently, the LBA: MAXLBA.CYL(i−1) of the last sector S in the track T, positioned just before this sector S, is obtained.

At this time, in a defect area (DA enclosed by a two-dot chain line in FIG. 3) set for a plurality of tracks T over which Entry(i) being examined exists, the number of usable sectors (non-defect sectors): GOOD_SEC in each track T is obtained by subtracting the sector count: SCNT(i) denoting the number of consecutive defect sectors from the number of sectors per track: SEC_TRK (step S212).

Then, in order to examine whether or not the obtained sector enters the defect area MAXLBA. CYL(i−1), which is the LBA of the last sector S in the track T positioned just before the defect area obtained in step S212, is subtracted from the target sector positional information: HLBA, then the result is divided by the number of non-defect sectors: GOOD_SEC in each track T in the defect area. Thus, the quotient: WORK1 and the remainder: WORK2 are obtained (step S213).

The quotient: WORK1 obtained above becomes the number of tracks continued up to the track T in which the target sector is positioned and the remainder: WORK2 becomes the number of sectors continued up to the target sector S in the track T when the first track T in the defect area is counted as "1".

In step S214 of FIG. 8, it is decided whether or not the quotient: WORK1 obtained in step S213 is smaller than the track count: TCNT(i) in Entry(i) being examined (step S214).

When the decision result is NO, that is, when the quotient: WORK1 is over the track count: TCNT(i), it is decided that the target sector is not in the defect area (ii), but positioned in a track T disposed after the defect area (ii). In this case, therefore, the push count (sum of the track count: TCNT(i) and the sector count: SCNT(i) products) in Entry(1) to Entry(i−1) are added to HLBA so as to obtain the target sector ABA. Thus, (cylinder number, head number, sector number), which is the parameter information CHS of the target sector, corresponding to the obtained ABA, is obtained.

On the other hand, when the decision result in step S214 is YES, that is, when the quotient: WORK1 is smaller than the track count: TCNT(i), the target sector is in the defect area (ii). In this case, the quotient: WORK1 and the cylinder number: CYL(i) obtained in step S209 and denoting the track T in which the first defect sector is positioned in this Entry(i) are added up, then "1" is subtracted from the result. The result is assumed as the temporary cylinder number: HLBA. CYL of the target sector. The remainder: WORK2 obtained in step S213 is assumed as the temporary sector number: HLBA. SEC of the target sector (step S215).

As described above, the temporary cylinder number: HLBA. CYL and the temporary sector number: HLBA. SEC are obtained in step S215. This is because the target sector, when the remainder: WORK2 is "0", is positioned at the end of the track T of the temporary cylinder number: HLBA. CYL and the target sector, when the remainder: WORK2 is not "0", is positioned in the track T that follows the track T represented by the temporary cylinder number: HLBA. CYL. It is thus decided whether or not the remainder: WORK2 is "0" in step S216.

When the remainder: WORK2 is "0", the temporary cylinder number: HLBA. CYL is assumed as the target sector cylinder number: HLBA. CYL as is. When the remainder: WORK2 is not "0", "1" is added to the temporary cylinder number: HLBA. CYL and the result is assumed as the target sector cylinder number: HLBA. CYL so as to update the cylinder number (step S217).

Then, a decision is made as to whether or not the remainder: WORK2 in this Entry(i) obtained in step S209 is greater than the first defect sector number: SEC(i) (step S218).

When the remainder: WORK2 is greater than the first defect sector number: SEC(i), the sector count: SCNT(i) in this Entry(i) is added to the temporary sector number: HLBA. SEC, then "1" is subtracted from the result. And, the result is assumed as the target sector number: HLBA. SEC (step S219). When the remainder: WORK2 is not greater than the first defect sector number: SEC(i), the temporary sector number: HLBA.SEC is assumed as the target sector number: HLBA.SEC as is.

As such, it is possible to add a defect sector registered in a defect map to the target sector positional information: HLBA specified by host apparatus 20, thereby obtaining the target sector parameter information CHS (cylinder number, head number, sector number).

The following is an example of how to obtain target sector parameter information CHS by the preferred method shown in FIGS. 6–8. It is premised here that the example shown in FIG. 3 is employed, the number of sectors per track is "10," and the sectors S shown in FIG. 3 are all positioned on the surface of the head number "0."

EXAMPLE 1

When host apparatus 20 outputs a read/write command corresponding to the sector S of HLBA=0003, it is found in searches in steps S202 to S204 that HLBA=0003 becomes smaller than PLBA(1)=0005 of the defect sector group G1 in Entry(1): (i=1) in the defect map table shown in FIG. 4(b) at pointer i=1.

Then, the condition of i=1 is satisfied in step S205, so that a normal conversion is done for the data. Specifically, the HLBA=0003 sector S is positioned before Entry(1). Thus, the push count is "0" and the following condition is satisfied:

HLBA=ABA=0003

Consequently, the parameter information CHS corresponding to this ABA becomes (cylinder number, head number, sector number)=(0, 0, 3).

EXAMPLE 2

When host apparatus 20 outputs a read/write command corresponding to the HLBA=0006 sector S, it is found in searches in steps S202 to S204 that HLBA=0006 becomes smaller than PLBA(1)=0009 of the defect sector group G2 in Entry(2): (i=2) in the defect map table shown in FIG. 4(b) at pointer i=2.

Then, the condition i=1 is not satisfied in step S205. Control thus goes to step S206 or after. And, because the track count: TCNT(1) in Entry(1)>1 is not satisfied in step S207, normal data conversion is done for the data at this time. Concretely, Entry(1) precedes the HLBA=0006 sector S, the push count: TCNT(1)×SCNT(1)=1×3=3 in this Entry (1) is added to HLBA=0006.

As a result, the target sector ABA is calculated as follows:
ABA=HLBA+TCNT(1)×SCNT(1)
=0006+3
=0009

Consequently, the parameter information CHS corresponding to this ABA becomes (cylinder number, head number, sector number)=(0, 0, 9).

EXAMPLE 3

When host apparatus 20 outputs a read/write command corresponding to the HLBA=001F sector S, it is found in searches in steps S202 to S204 that HLBA=001F becomes smaller than PLBA(3)=002E of the defect sector group G3 in Entry(3): (i=3) in the defect map table shown in FIG. 4(b) at pointer i=3.

Because the track count: TCNT(2) is "5" in the Entry(2): (i=2) defect sector group G2 positioned just before this Entry(3) in steps S206 to S207, it is checked whether or not the target sector HLBA=001F is included in the defect area DA that includes the defect sector group G2 in step S208 and after.

In step S208, the ABA of the first defect sector S1 in the defect sector group G2 of Entry(2) is obtained. To obtain this result, Entry(2) PLBA=0009 and the push count: TCNT(1)× SCNT(1)=1×3=3 of Entry(1) positioned before this Entry(2) are added up. Consequently, the ABA(2) is calculated as follows:
ABA(2)=PLBA(2)+TCNT(1)×SCNT(1)
=0009+3
=000C Then, the first defect sector S1 ABA(2)=000C is divided by the number of sectors per track: SEC_TRK=10. As a result, the quotient "1" is assumed as the cylinder number: CYL(2) denoting the track T in which the first defect sector S1 is positioned and the remainder "2" is assumed as the sector number: SEC(2) in which the first defect sector S1 is positioned.

In step S210, the minimum ABA value: MINABA.CYL (2) in the track T in cylinder number: CYL(2)=1 is obtained as follows:
MINABA. CYL(2)=ABA(2)−SEC(2)
=000C−2
=000A Consequently, the ABA of the first sector S2 in the defect area DA is obtained. Then, the minimum value: MINLBA.CYL(2) of the LBA in the track T of the cylinder number: CYL(2)=1 is obtained in step S211.

Afterwards, the push count TCNT(1)×SCNT(1)=1×3=3 in Entry(1) preceding Entry(2) being examined is subtracted from the ABA of the minimum value: MINLBA.CYL(1) in the track T of the cylinder number: CYL(2)=1 obtained in step S210. The result will become:
MINLBA.CYL(2)=MINABA.CYL(1)−MINLBA.CYL (2)
=000A−3
=0007

As a result, the LBA of the first sector S2 in the defect area DA is obtained.

In the next step S212, "1" is subtracted from the LBA of the first sector S2 in the track T in which the first defect sector 1 is positioned, obtained in step S211, so as to obtain the LBA: MAXLBA.CYL(1) of the last sector S3 in the track T positioned just before this sector S2 as follows:

MAXLBA.CYL(1)=MINLBA.CYL(2)−1
=0007−1
=0006

At the same time, the number of non-defect sectors S in each track T: GOOD_SEC in the defect area DA in which Entry(2) being examined exists is obtained as follows:

GOOD_SEC=SEC_TRK−SCNT(2)
=10−3
=7

Then, in step S213, the last sector S3 LBA: MAXLBA.CYL(1)=0006 in the track T just before the defect area (ii) obtained in step S212 is subtracted from the target sector positional information: HLBA=001F, then the result is divided by the number of non-defect sectors in each track: GOOD_SEC=7.

Thus, the quotient: WORK1=3 and the remainder: WORK2=4 are obtained.

Because the quotient: WORK1=3 obtained in step S213 is smaller than the track count: TCNT(2)=5 in Entry(2), it is found in step S214 that the target sector is positioned in the defect area (ii). In this case, control goes to step S215 so as to obtain the target sector temporary cylinder number: HLBA.CYL as follows.

HLBA.CYL=WORK1+CYL(2)−1
=3+1−1
=3

Because the remainder: WORK2=4 obtained in step S213 is not "0," the target sector cylinder number: HLBA.CYL is obtained in step S217 as follows:

HLBA.CYL=HLBA.CYL+1
=3+1
=4

Furthermore, because the remainder: WORK2=4 obtained in step S213 is greater than the first defect sector S1 number: SEC(2)=2 in this Entry(2), the target sector number: HLBA.SEC is calculated as follows:

HLBA.SEC=HLBA.SEC+SCNT(2)−1
=4+3−1
=6

Such way, the parameter information CHS corresponding to the target sector So positional information: HLBA=001F specified from host apparatus 20 becomes (cylinder number, head number, sector number)=(4, 0, 6).

Figure 9:
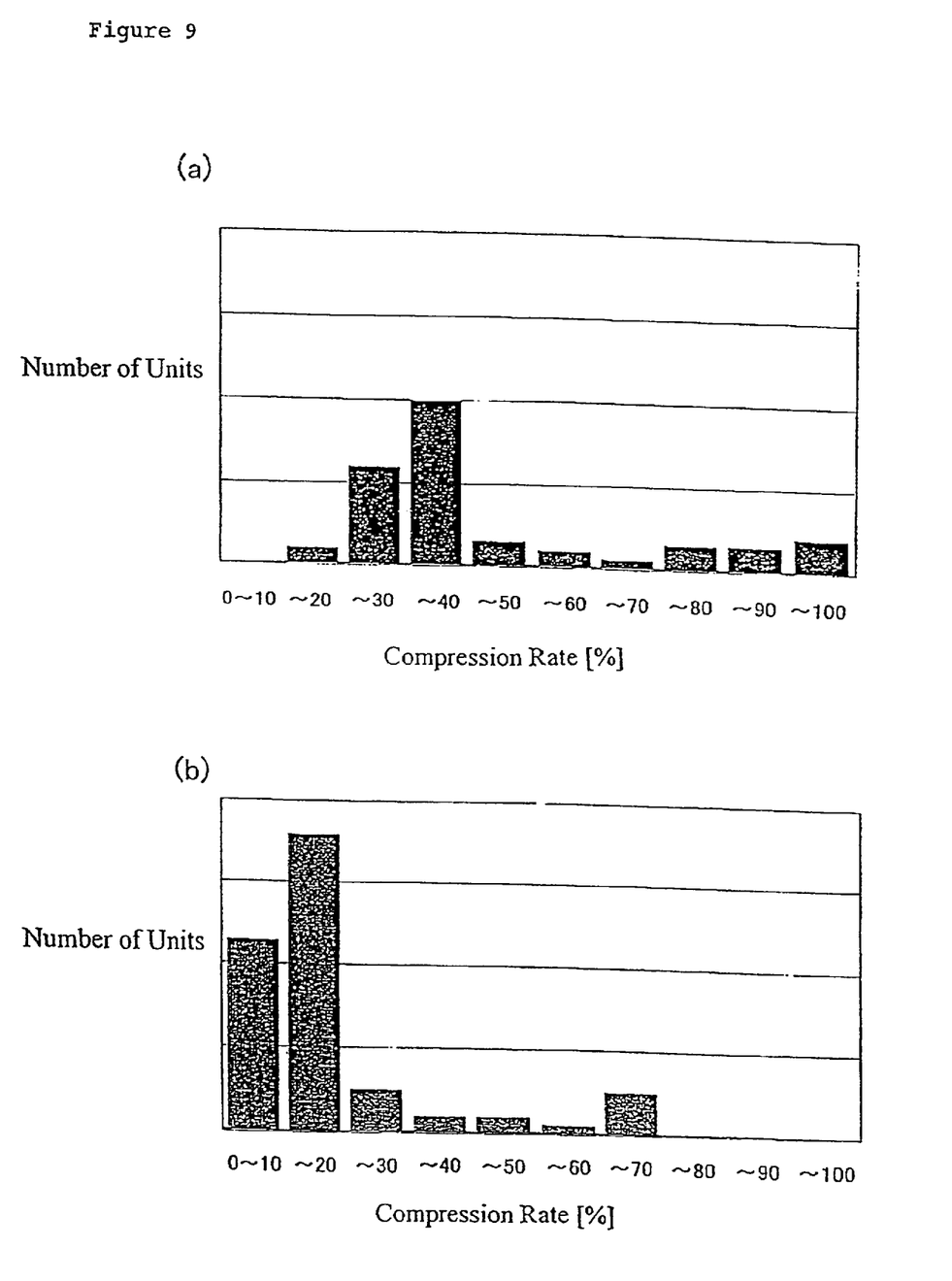
FIGS. 9(a)–9(b) show comparison result of data amount in a defect map between a point-registration method and a line-registration method.

FIG. 9 shows a result of comparison between the data amount (FIG. 9(b)) in a defect map generated by the two-dimensional registration method in this embodiment and the data amount in a defect map (FIG. 9(a)) generated by the conventional line registration method with respect to the data amount in a defect map generated by the same conventional point registration method. The data used in this comparison is collected by the present inventor by sampling multiple hard disk drives. In this comparing test, three types of defect maps are generated with use of the point registration method, the line registration method, and the two-dimensional registration method for one and the same disk drive apparatus. And, the data amount of the defect map generated by the point registration method is assumed as 100% and the data compression rate from this data amount is calculated in each hard disk drive apparatus. It is found that the defect map generated by the data in the line registration method shown in FIG. 9(a) is compressed within a range of 10% to 100% from that in the defect map generated by the conventional line registration method.

On the contrary, the data in the defect map generated by the two-dimensional method in this embodiment shown in FIG. 9(b) is compressed within 0% to 70% from that in the defect map generated by the conventional line registration method. And, it is found that satisfactory results for both of the distribution range and the peak are at the higher data compression rate side even when compared with those in the defect map generated by the line registration method shown in FIG. 9(a).

However, note that FIG. 9 shows just a sampling result obtained from the predetermined number of hard disk drive apparatuses extracted at random by the inventor. Thus, it is natural that the number of hard disk drive apparatus employed for the sampling will lead a different result of the compression rate distribution from that shown in FIG. 9.

As has been described, the present invention provides a method for registering a defect map within a hard disk drive. A defect map generated as defect sector positional information on recording disk 11 in hard disk drive 10 is configured by the first defect sector positional information: PLBA(i), the number of tracks in which defect sectors are continued in the radial direction of recording disk 11: TCNT(i), and the number of defect sectors continued in the circumferential direction of recording disk 11: SCNT(i). Consequently, a defect sector group caused by a damage of recording disk 11 can be registered as plane-like two-dimensional information, not as point-like information (point-registration method) nor line-like information (line-registration method) employed in the conventional technique. As a result, a large defect sector group can be represented by one data item, thereby the number of defect sectors in the whole defect map can be reduced so as to compress the data amount in the defect map.

In order to obtain the effects as described above, the following two conditions should preferably be satisfied:

(1) defect sectors are continued in a direction tracks T are disposed (radial direction) on the same surface of recording disk 11 and the number of defect sectors (sector count: SCNT(i)) is the same among those tracks T; and (2) there is no other defect sector in the defect area (ii) in which there are defect sectors registered as two-dimensional information.

This is because the number of defect sectors in a defect map increases unless the conditions (1) and (2) are satisfied, thereby the data amount in the defect map increases. It is therefore effective to set defect sectors so as to satisfy the conditions (1) and (2). Not only actually existing defect sectors, but also non-defect sectors S around them are set as defect sectors.

Figure 10:
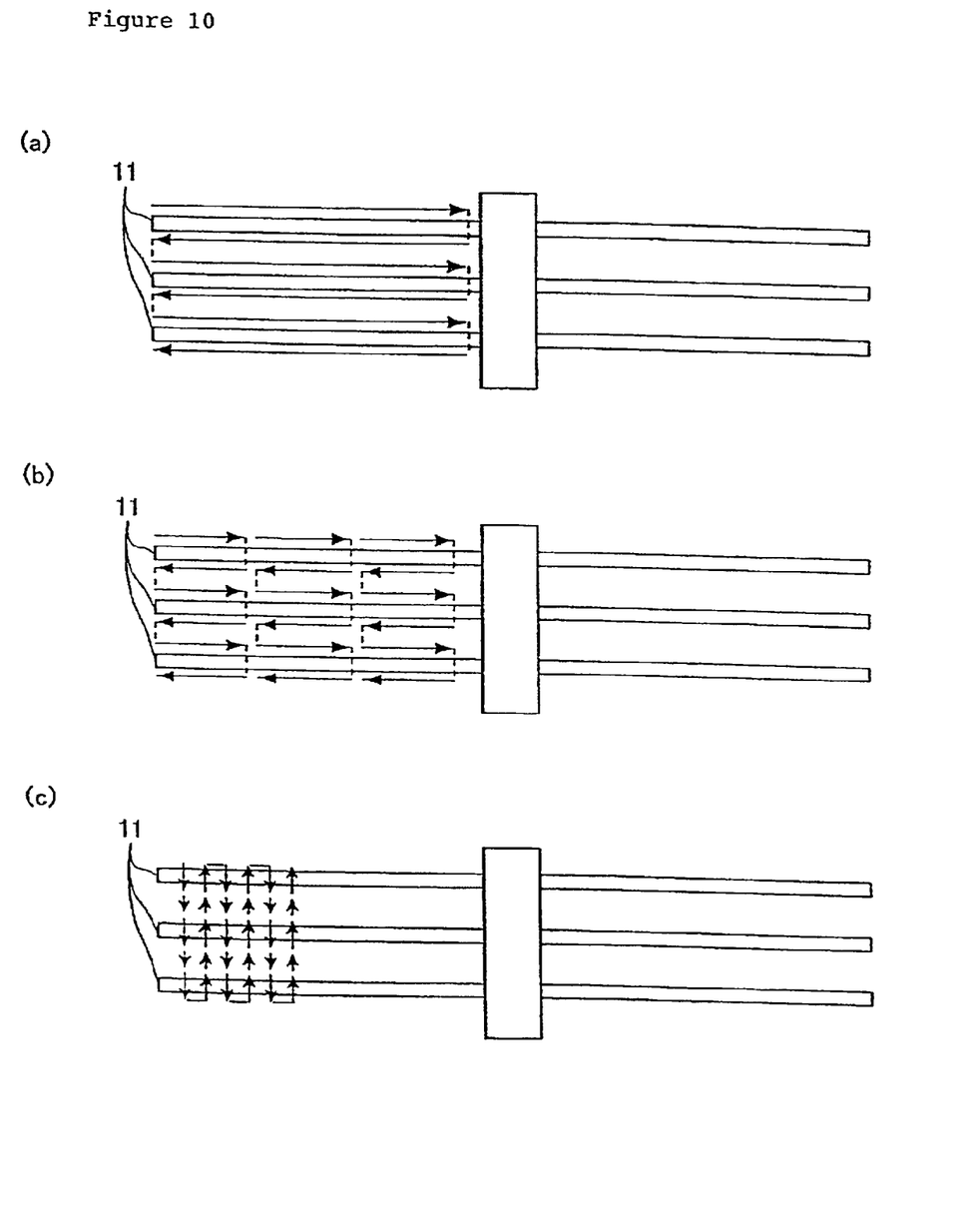
FIGS. 10(a)–10(c) depict how a head seeks a target sector.

In the above embodiment, no specific seeking method of head 12 is described with respect to recording disk 11. In other words, no ABA setting method is mentioned with respect to recording disk 11. However, for example, when head 12 is driven to seek in order of the ABA values, there is a method employable so that head 12 seeks the surface of recording disk 11 from the outer periphery to the inner periphery sequentially as shown in FIG. 10(a) first, then goes to the back side of recording disk 11 so as to seek the back side from the inner periphery to the outer periphery, then seeks the surface of a next recording disk from the outer periphery to the inner periphery. There is also another method employable so that head 12 seeks the surface of recording disk 11 only by the predetermined number of tracks T from the outer periphery to the inner periphery as shown in FIG. 10(b), then goes to the back side of recording disk 11 so as to seek the back side from the inner periphery to the outer periphery. After repeating such the seeking, the head goes to the inner side so as to repeat the similar seeking. Another method as shown in FIG. 10(c) may be employable. According to this method, head 12 is switched for each track T.

While the invention has been particularly shown and described with reference to a preferred embodiment, it will be understood by those skilled in the art that various changes in form and detail may be made therein without departing from the spirit and scope of the invention.

What is claimed is:

1. A method for registering a defect map within a hard drive, said method comprising:

accepting, from a host computer, specification of a sector from/to which data is to be read/written according to a logical address without any consideration to a defect sector on a recording disk within said hard disk;

obtaining a physical address of said sector with reference to a range in which defect sectors exist, wherein said obtaining further includes sequentially searching sectors on said recording disk in a predetermined order;

adding said logical address of said sector to a number of defect sectors up to said sector to obtain a physical address of said sector when the number of tracks is 1 in said range that denotes a presence of defect sectors continued up to immediately before said sector; and adding said logical address of said sector to a number of defect sectors up to said sector to obtain a physical address of said sector when the number of tracks is 2 or higher in said range that denotes a presence of defect sectors continued up to immediately before said sector, and said sector is not included in said range; and reading/writing data from/to said sector according to said obtained physical address.

2. A method for registering a defect map that denotes positions of defect sectors on a recording disk, said method comprising:

setting a plurality sectors on a recording disk, as defect sectors when said plurality of sectors does not satisfy a predetermined standard; and registering said plurality of defect sectors continued either in a circumferential direction or in a radial direction of said recording disk as one block in a defect map according to the position of a first defect sector, the number of said plurality of defect sectors continued in a track of said recording disk, and the number of tracks in which said plurality of defect sectors are continued in a radial direction of said recording disk, wherein said number of tracks, when two or higher, is registered in said defect map so as to avoid presence of two or more defect sector blocks in the same track.

3. The method of claim 2, wherein a number of said sectors, when two or higher, is registered in said defect map so as to have an identical value among tracks.

4. A hard drive, comprising:

a recording disk on which a plurality of sectors are formed;

a head assembly having a head that reads/writes data from/on said recording disk;

a controller for controlling said head assembly to read/write data from/to said recording disk, wherein said controller includes:

setting a plurality of sectors on a recording disk as defect sectors when said plurality of sectors d not satisfy a predetermined standard; and registering said plurality of defect sectors continued either in a circumferential direction or in a radial direction of said recording disk as one block in a defect map according to the position of a first defect sector, the number of said plurality of defect sectors continued in a track of said recording disk, and the number of tracks in which said plurality of defect sectors are continued in a radial direction of said recording disk, wherein said number of tracks, when two or higher, is registered in said defect map so as to avoid presence of two or more defect sector blocks in the same track.

5. The hard drive of claim 4, wherein a number of said sectors, when two or higher, is registered in said defect map so as to have an identical value among tracks.

* * * * *